(12) United States Patent
Ishikawa et al.

(10) Patent No.: US 8,551,671 B2
(45) Date of Patent: Oct. 8, 2013

(54) FUEL CELL FLUID SEALING STRUCTURE

(75) Inventors: Eri Ishikawa, Utsunomiya (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 978 days.

(21) Appl. No.: 12/146,870

(22) Filed: Jun. 26, 2008

(65) Prior Publication Data

US 2009/0004539 A1    Jan. 1, 2009

(30) Foreign Application Priority Data

Jun. 28, 2007   (JP) ................................. 2007-170614

(51) Int. Cl.
*H01M 8/02* (2006.01)
*H01M 8/04* (2006.01)
*H01M 8/10* (2006.01)

(52) U.S. Cl.
USPC ............ 429/508; 429/514; 429/483; 429/457

(58) Field of Classification Search
USPC ......... 429/413, 434, 479, 437, 492, 508, 514, 429/457, 483
See application file for complete search history.

(56) References Cited

U.S. PATENT DOCUMENTS

| 6,503,653 | B2 | 1/2003 | Rock | |
|---|---|---|---|---|
| 6,566,001 | B2 * | 5/2003 | Yosida et al. ................. | 429/413 |
| 6,610,435 | B1 | 8/2003 | Maruyama et al. | |
| 6,667,124 | B2 | 12/2003 | Suenaga et al. | |
| 6,893,770 | B2 | 5/2005 | Rock | |
| 2002/0119358 | A1 * | 8/2002 | Rock ............................... | 429/32 |
| 2002/0187384 | A1 * | 12/2002 | Kato et al. ...................... | 429/35 |
| 2003/0027032 | A1 * | 2/2003 | Sugita et al. .................... | 429/35 |
| 2003/0129474 | A1 * | 7/2003 | Kikuchi et al. ................. | 429/35 |
| 2003/0134173 | A1 * | 7/2003 | Hatoh et al. .................... | 429/35 |

FOREIGN PATENT DOCUMENTS

| CN | 1493092 A1 | 4/2004 |
|---|---|---|
| CN | 1493092 A2 | 4/2004 |
| JP | 2001-102072 A1 | 4/2001 |
| JP | 2002-42836 A2 | 2/2002 |

OTHER PUBLICATIONS

Chinese Office Action for Application No. 200810110298.6, dated Oct. 23, 2009.

* cited by examiner

*Primary Examiner* — Kenneth Douyette
(74) *Attorney, Agent, or Firm* — Nelson Mullins Riley & Scarborough LLP; Anthony A. Laurentano (57) ABSTRACT

A unit cell of a fuel cell is formed by stacking a membrane electrode assembly between a first metal separator and a second metal separator in a stacking direction. A frame is provided in an outer end of the membrane electrode assembly. A seal member is formed on the frame. The seal member includes a first seal as a fuel gas seal, a second seal as a coolant seal, and a third seal as an oxygen-containing gas seal. The first seal, the second seal, and the third seal are offset from each other in the stacking direction.

5 Claims, 10 Drawing Sheets

PRIOR ART

FIG. 10

FUEL CELL FLUID SEALING STRUCTURE

BACKGROUND OF THE INVENTION

1. Field of the Invention

The present invention relates to a fuel cell including a cell unit formed by stacking an electrolyte electrode assembly between a first separator and a second separator. The electrolyte electrode assembly includes a pair of electrodes and an electrolyte interposed between said electrodes.

2. Description of the Related Art

For example, a solid polymer electrolyte fuel cell employs a solid polymer electrolyte membrane. The solid polymer electrolyte membrane is a polymer ion exchange membrane. In the fuel cell, an anode and a cathode each including an electrode catalyst layer and a porous carbon are provided on both sides of the solid polymer electrolyte membrane to form a membrane electrode assembly (electrolyte electrode assembly). The membrane electrode assembly is sandwiched between separators (bipolar plates) to form a unit cell. In use, normally a predetermined number of unit cells are stacked together to form a fuel cell stack.

In general, the fuel cell adopts so called internal manifold structure in which supply passages and discharge passages extending through the separators in the stacking direction are provided in the fuel cell. A fuel gas, an oxygen-containing gas, and a coolant are supplied to a fuel gas flow field, an oxygen-containing gas flow field, and a coolant flow field through the respective supply passages, and thereafter, the fuel gas, the oxygen-containing gas, and the coolant are discharged from the fuel gas flow field, the oxygen-containing gas flow field, and the coolant flow field through the respective discharge passages.

Figure 10:
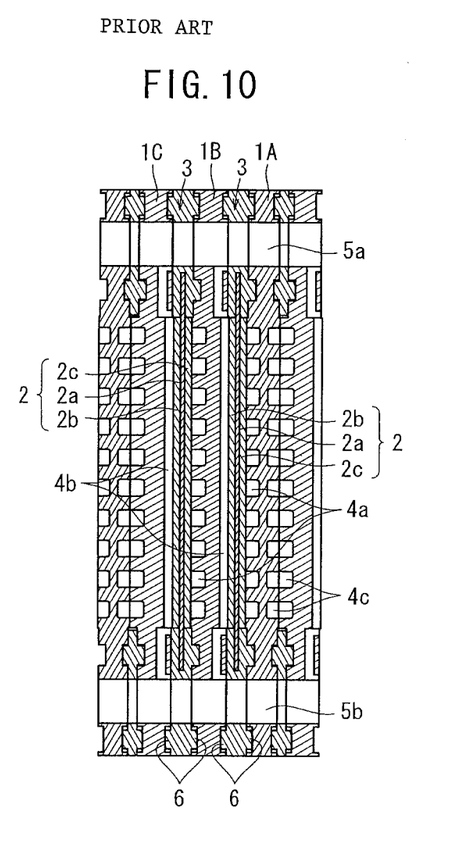
FIG. 10 is a cross sectional view showing a conventional fuel cell.

For example, in Japanese Laid-Open Patent Publication No. 2001-102072, as shown in FIG. 10, an electrode unit 2 is stacked on a separator 1A, a separator 1B is stacked on the electrode unit 2, another electrode unit 2 is stacked on the separator 1B, and a separator 1C is stacked on the electrode unit 2. The electrode unit 2 is formed by joining a solid polymer electrolyte membrane 2a between an oxygen-containing gas electrode 2b and a fuel electrode 2c. A gasket 3 is formed integrally with an outer end of each of the solid polymer electrolyte membrane 2a by injection molding.

Each of the separators 1A, 1B has a fuel gas supply channel 4a on a surface facing the fuel electrode 2c, and each of the separators 1B, 1c has an air supply channel 4b on a surface facing the oxygen-containing gas electrode 2b. A coolant water supply channel 4c is provided between the separators 1A, 1C.

An air supply hole (fuel gas supply hole, coolant water supply hole) 5a and an air discharge hole (a fuel gas discharge hole, a coolant water discharge hole) 5b extend through the separators 1A, 1B, and 1C and the gaskets 3 in the stacking direction, and the air supply hole 5a, the air discharge hole 5b are connected to the air supply channels 4b. On both surfaces of the gaskets 3, bead-like protrusions 6 are provided for preventing leakage of the fuel gas, the air, and the coolant water.

However, in order to reliably prevent leakage of the fuel gas, the air, and the coolant water, the height of the protrusions 6 (dimension in the stacking direction) need to be large. Thus, the gaskets 3 are significantly thick, and it is not possible to reduce the overall thickness (size) of the fuel cell.

In particular, in a fuel cell stack mounted in a vehicle, since several hundreds of unit cells are stacked together, reduction in the thickness is desired. For this reason, the above fuel cell cannot be adopted for this type of the fuel cell stack.

SUMMARY OF THE INVENTION

The present invention has been made to solve the problem described above, and an object of the present invention is to provide a fuel cell which easily and reliably achieves reduction in the thickness in a direction of stacking components of the fuel cell, and achieve the desired sealing performance.

The present invention relates to a fuel cell including a cell unit formed by stacking an electrolyte electrode assembly between a first separator and a second separator. The electrolyte electrode assembly includes a pair of electrodes and an electrolyte interposed between the electrodes.

A frame is provided in an outer end of the membrane electrode assembly. The frame includes a first seal, a second seal, and a third seal around the electrodes. The first seal, the second seal, and the third seal are offset from each other in the stacking direction.

In the present invention, the first seal, the second seal, and the third seal are provided for the electrolyte electrode assembly. Therefore, no seal member is required in the first and second separators. Thus, the first and second separators can be produced at low cost efficiently. The entire fuel cell can be obtained economically.

Further, the first seal, the second seal, and the third seal are offset from each other in the stacking direction. Thus, the sufficient seal height is effectively achieved. It is possible to achieve improvement in durability and performance of the seals, while ensuring that the height of the fuel cell in the stacking direction does not become large.

Further, the outer dimensions of the first and second separators correspond to the power generation area of the electrolyte electrode assembly. Thus, reduction in the size and weight is easily achieved, and the overall weight of the fuel cell is reduced effectively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
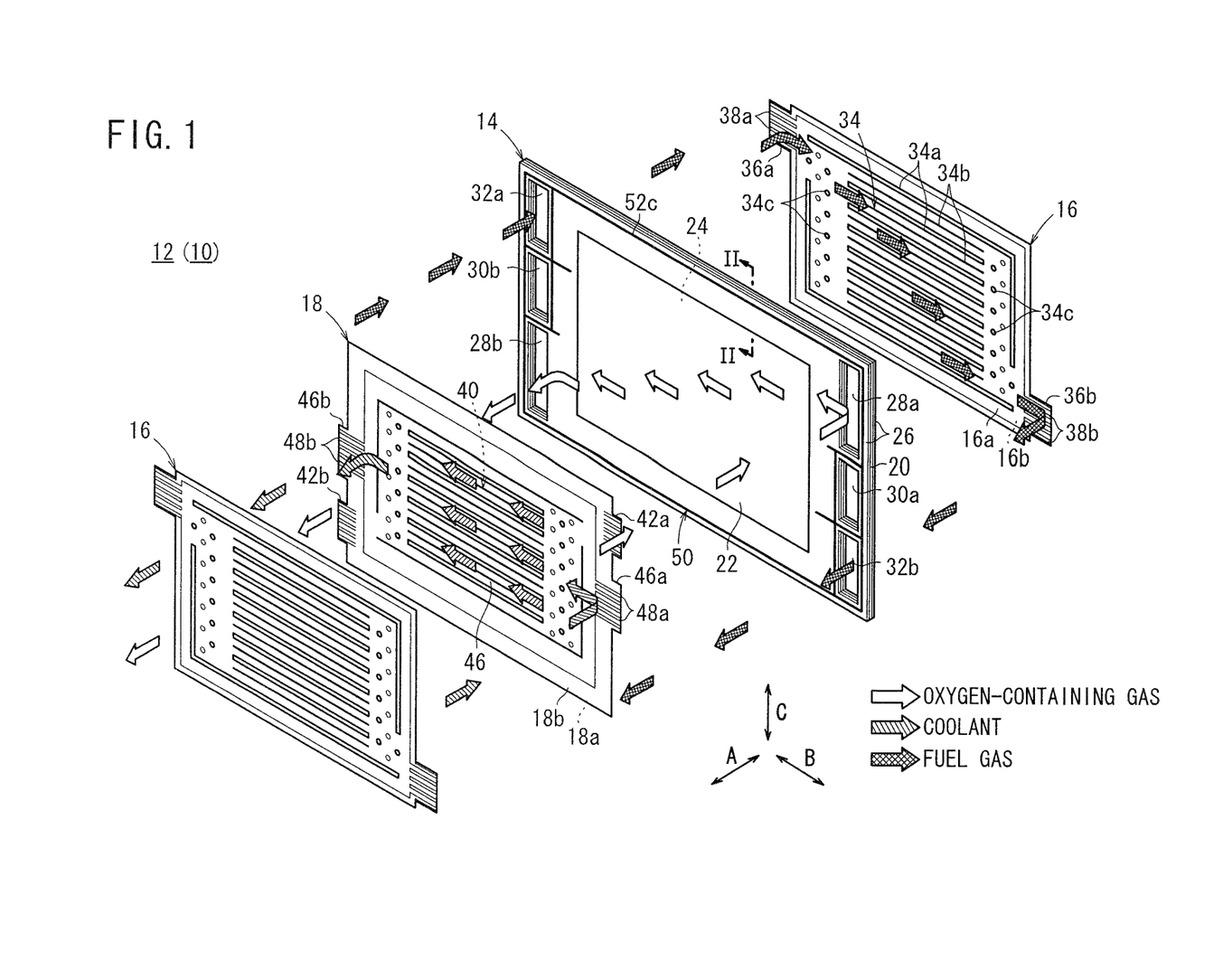
FIG. 1 is an exploded perspective view schematically showing a fuel cell according to a first embodiment of the present invention.
Figure 2:
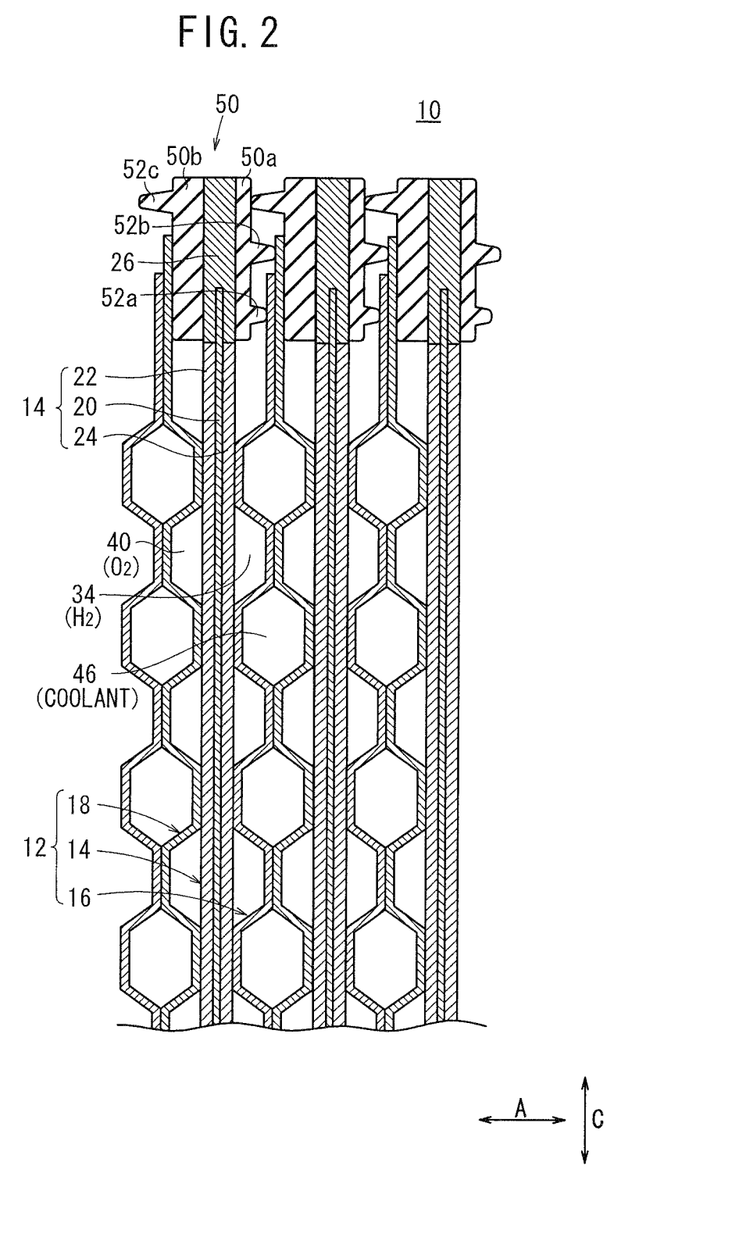
FIG. 2 is a cross sectional view showing the fuel cell, taken along a line II-II in FIG. 1.

FIG. 1 is an exploded perspective view schematically showing a fuel cell 10 according to a first embodiment of the present invention. FIG. 2 is a cross sectional view showing the fuel cell 10, taken along a line II-II in FIG. 1.

The fuel cell 10 is formed by stacking a plurality of unit cells (cell units) 12 in a horizontal direction indicated by an arrow A. Each of the unit cells 12 includes a membrane electrode assembly (electrolyte electrode assembly) 14 and a first metal separator 16 and a second metal separator 18 sandwiching the membrane electrode assembly 14.

For example, the membrane electrode assembly 14 includes a cathode 22, an anode 24, and a solid polymer electrolyte membrane (electrolyte) 20 interposed between the cathode 22 and the anode 24 (see FIG. 2). The solid polymer electrolyte membrane 20 is formed by impregnating a thin membrane of perfluorosulfonic acid with water, for example.

The surface area of the solid polymer electrolyte membrane 20 is larger than the surface areas of the cathode 22 and the anode 24. A resin frame 26 is formed integrally with the outer end of the solid polymer electrolyte membrane 20, e.g., by injection molding. As the resin material, in addition to general-purpose plastic, for example, engineering plastic or super engineering plastic is used.

Each of the cathode 22 and the anode 24 has a gas diffusion layer (not shown) such as a carbon paper, and an electrode catalyst layer (not shown) of platinum alloy supported on porous carbon particles. The carbon particles are deposited uniformly on the surface of the gas diffusion layer.

As shown in FIG. 1, at one end of the frame 26 in a direction indicated by an arrow B, an oxygen-containing gas supply passage 28a for supplying an oxygen-containing gas, a coolant supply passage 30a for supplying a coolant, and a fuel gas discharge passage 32b for discharging a fuel gas such as a hydrogen-containing gas are arranged in a vertical direction indicated by an arrow C.

At the other end of the frame 26 in the direction indicated by the arrow B, a fuel gas supply passage 32a for supplying the fuel gas, a coolant discharge passage 30b for discharging the coolant, and an oxygen-containing gas discharge passage 28b for discharging the oxygen-containing gas are arranged in the vertical direction indicated by the arrow C.

The outer ends of the first metal separator 16 and the second metal separator 18 are provided inside the oxygen-containing gas supply passage 28a, the coolant supply passage 30a, the fuel gas discharge passage 32b, the fuel gas supply passage 32a, the coolant discharge passage 30b, and the oxygen-containing gas discharge passage 28b (hereinafter simply referred to as the fluid passages). The outer dimensions of the first metal separator 16 are smaller than the outer dimensions of the second metal separator 18 (see FIG. 2).

As shown in FIG. 1, the first metal separator 16 has a fuel gas flow field 34 on its surface 16a facing the membrane electrode assembly 14. The fuel gas flow field 34 is formed by providing ridges 34a and grooves 34b alternately in the direction indicated by the arrow C. The ridges 34a protrude from the surface 16a, and extend in the direction indicated by the arrow B. Thus, the fuel gas flow field 34 is formed straight in the direction indicated by the arrow B. Bosses 34c are formed on both sides of the fuel gas flow field 34.

At both ends of the first metal separator 16 in the direction indicated by the arrow B, extensions 36a, 36b protruding at positions corresponding to the fuel gas supply passage 32a and the fuel gas discharge passage 32b are provided. In the extension 36a, an inlet channel 38a connecting the fuel gas supply passage 32a and the fuel gas flow field 34 is formed by corrugated grooves. In the extension 36b, an outlet channel 38b connecting the fuel gas discharge passage 32b and the fuel gas flow field 34 is formed by corrugated grooves.

Figure 3:
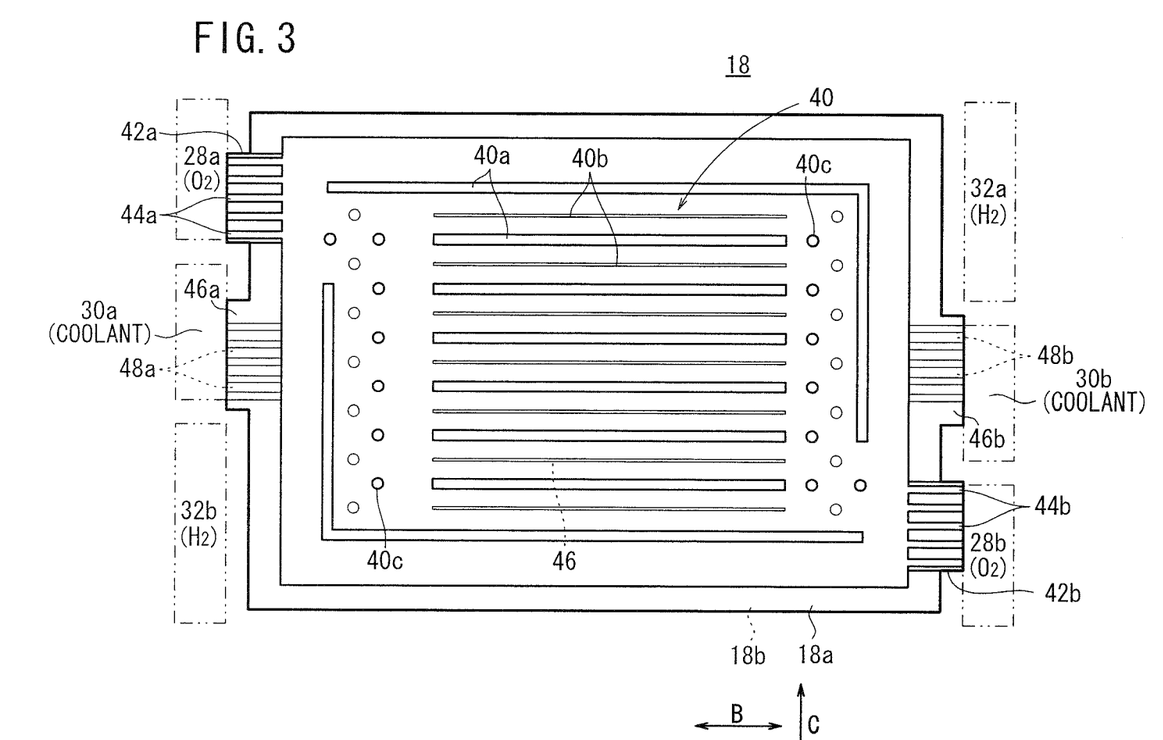
FIG. 3 is a front view showing a second metal separator of the fuel cell.

As shown in FIG. 3, the second metal separator 18 has an oxygen-containing gas flow field 40 on its surface 18a facing the membrane electrode assembly 14. The oxygen-containing gas flow field 40 is formed by providing ridges 40a and grooves 40b alternately in the direction indicated by the arrow C. The ridges 40a protrude from the surface 18a, and extend in the direction indicated by the arrow B. Thus, the oxygen-containing gas flow field 40 is formed straight in the direction indicated by the arrow B. Bosses 40c are formed on both sides of the oxygen-containing gas flow field 40.

At both ends of the second metal separator 18 in the direction indicated by the arrow B, extensions 42a, 42b protruding at positions corresponding to the oxygen-containing gas supply passage 28a and the oxygen-containing gas discharge passage 28b are provided. In the extension 42a, an inlet channel 44a connecting the oxygen-containing gas supply passage 28a and the oxygen-containing gas flow field 40 is formed by corrugated grooves. In the extension 42b, an outlet channel 44b connecting the oxygen-containing gas discharge passage 28b and the oxygen-containing gas flow field 40 is formed by corrugated grooves.

A coolant flow field 46 is formed between a surface 16b of the first metal separator 16 and a surface 18b of the second metal separator 18, i.e., on the back surfaces of the ridges and grooves forming the fuel gas flow field 34 and the oxygen-containing gas flow field 40 (see FIG. 1).

Further, at both ends of the second metal separator 18 in the direction indicated by the arrow B, extensions 46a, 46b are provided. The extensions 46a, 46b protrude outwardly at substantially central positions in the direction indicated by the arrow C. As shown in FIGS. 1 and 3, the extension 46a protrudes on the side of the coolant supply passage 30a, and in the extension 46a, an inlet channel 48a connecting the coolant supply passage 30a and the coolant flow field 46 is formed by corrugated grooves. The extension 46b protrudes on the side of the coolant discharge passage 30b, and in the extension 46b, an outlet channel 48b connecting the coolant discharge passage 30b and the coolant flow field 46 is formed by corrugated grooves.

Figure 4:
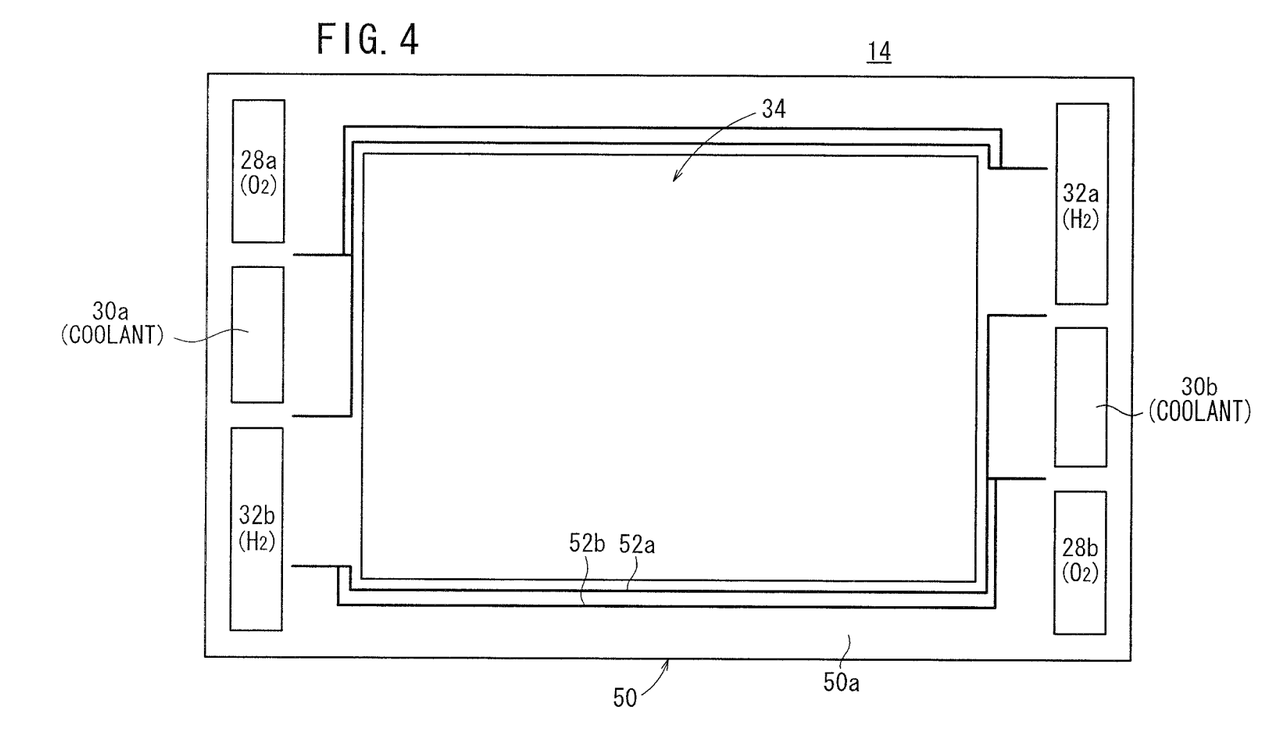
FIG. 4 is a front view showing a membrane electrode assembly of the fuel cell.

A seal member 50 is formed integrally with the frame 26 of the membrane electrode assembly 14. As shown in FIGS. 2 and 4, on the surface 50a of the first metal separator 16 side, the seal member 50 includes a first seal 52a which slidably contacts the outer end of the first metal separator 16, and a second seal 52b which slidably contacts the outer end of the second metal separator 18 of the adjacent unit cell 12.

On the surface 50b of the second metal separator 18 side of the seal member 50, a third seal 52c is provided. The third seal 52c is provided outside the outer end of the second metal separator 18. The third seal 52c slidably contacts the surface 50a of the seal member 50 formed on the frame 26 of the membrane electrode assembly 14 of the adjacent unit cell 12.

The first seal 52a, the second seal 52b, and the third seal 52c are provided around the cathode 22 and the anode 24, and are offset from each other in the stacking direction.

As shown in FIG. 4, the first seal 52a functions as a fuel gas seal for preventing leakage of the fuel gas while connecting the fuel gas supply passage 32a and the fuel gas discharge passage 32b to the fuel gas flow field 34.

As shown in FIG. 2, the second seal 52b is provided around the coolant flow field 46 formed between the adjacent first and second metal separators 16, 18, and functions as a coolant seal for preventing leakage of the coolant.

As shown in FIG. 1, the third seal 52c functions an oxygen-containing gas seal for preventing leakage of the oxygen-containing gas, while connecting the oxygen-containing gas supply passage 28a and the oxygen-containing gas discharge passage 28b to the oxygen-containing gas flow field 40. It should be noted that the first seal 52a, the second seal 52b, and the third seal 52c may be used selectively as the fuel gas seal, the coolant seal, and the oxygen-containing gas seal, respectively.

For example, the seal member 50 is made of an EPDM (Ethylene Propylene Diene Monomer), a silicone rubber, a nitrile rubber, or an acrylic rubber. For example, the seal member 50 is formed by injection molding using melted silicone resin heated to a predetermined temperature (e.g., 160° C. to 170° C.).

Next, operation of the fuel cell 10 will be described below.

As shown in FIG. 1, an oxygen-containing gas is supplied to the oxygen-containing gas supply passage 28a, and a fuel gas such as a hydrogen-containing gas is supplied to the fuel gas supply passage 32a. Further, a coolant such as pure water or ethylene glycol is supplied to the coolant supply passage 30a.

In each of the unit cells 12, the oxygen-containing gas supplied to the oxygen-containing gas supply passage 28a flows through the inlet channel 44a formed in the extension 42a of the second metal separator 18 to the surface 18a. Thus, the oxygen-containing gas is supplied to the oxygen-containing gas flow field 40 connected to the inlet channel 44a (see FIGS. 1 and 3).

The oxygen-containing gas supplied to the oxygen-containing gas flow field 40 is supplied to the cathode 22 of the membrane electrode assembly 14 for inducing an electrochemical reaction at the cathode 22, and the remaining oxygen-containing gas is discharged into the oxygen-containing gas discharge passage 28b through the outlet channel 44b.

The fuel gas supplied to the fuel gas supply passage 32a flows into the inlet channel 38a formed in the extension 36a of the first metal separator 16, and the fuel gas is supplied to the fuel gas flow field 34 along the surface 16a of the first metal separator 16 (see FIG. 1). The fuel gas supplied to the fuel gas flow field 34 is supplied to the anode 24 of the membrane electrode assembly 14 for inducing an electrochemical reaction at the anode 24, and the remaining fuel gas is discharged into the fuel gas discharge passage 32b through the outlet channel 38b.

Thus, in the membrane electrode assembly 14, the oxygen-containing gas supplied to the cathode 22, and the fuel gas supplied to the anode 24 are consumed in the electrochemical reactions at electrode catalyst layers of the cathode 22 and the anode 24 for generating electricity.

Further, the coolant supplied to the coolant supply passage 30a flows through the inlet channel 48a formed in the extension 46a of the second metal separator 18, and then, the coolant is supplied to the coolant flow field 46. The coolant supplied to the coolant flow field 46 cools the membrane electrode assembly 14, and then, the coolant is discharged into the coolant discharge passage 30b through the outlet channel 48b.

In the first embodiment, the frame 26 is provided in the outer end of the membrane electrode assembly 14, and the seal member 50 is provided on the frame 26. The seal member 50 includes the first seal 52a as the fuel gas seal, the second seal 52b as the coolant seal, and the third seal 52c as the oxygen-containing gas seal.

In the structure, no seal members are required in the first metal separator 16 and the second metal separator 18, and no injection molding using the liquid injection molding system (LIMS) is required for the first metal separator 16 and the second metal separator 18.

Further, the first metal separator 16 and the second metal separator 18 do not have any fluid passages. Thus, the first metal separator 16 and the second metal separator 18 can be produced efficiently and economically.

Further, the first seal 52a, the second seal 52b, and the third seal 52c are offset from each other in the stacking direction. In the structure, it is possible to ensure that the first seal 52a, the second seal 52b, and the third seal 52c have sufficient heights. The overall size of the fuel cell 10 in the stacking direction does not become excessively large, and improvement in the durability of the seals, and sealing performance is achieved advantageously.

Further, as shown in FIG. 1, the first metal separator 16 and the second metal separator 18 are shaped such that the first metal separator 16 and the second metal separator 18 are provided inside the fluid passages. In the structure, in comparison with the membrane electrode assembly 14, the outer dimensions of the first metal separator 16 and the second metal separator 18 are significantly small.

Thus, the outer dimensions of the first metal separator 16 and the second metal separator 18 correspond to the power generation area of the membrane electrode assembly 14, and reduction in the size and weight of the first metal separator 16 and the second metal separator 18 is achieved easily. Accordingly, the overall weight of the fuel cell 10 is effectively reduced advantageously.

Further, in the membrane electrode assembly 14, the resin frame 26 is formed integrally with the outer end of the solid polymer electrolyte membrane 20, and the fluid passages are formed in the frame 26. In the structure, metal surfaces are not exposed to the fluid passages, and the overall production operation is simplified easily.

Figure 5:
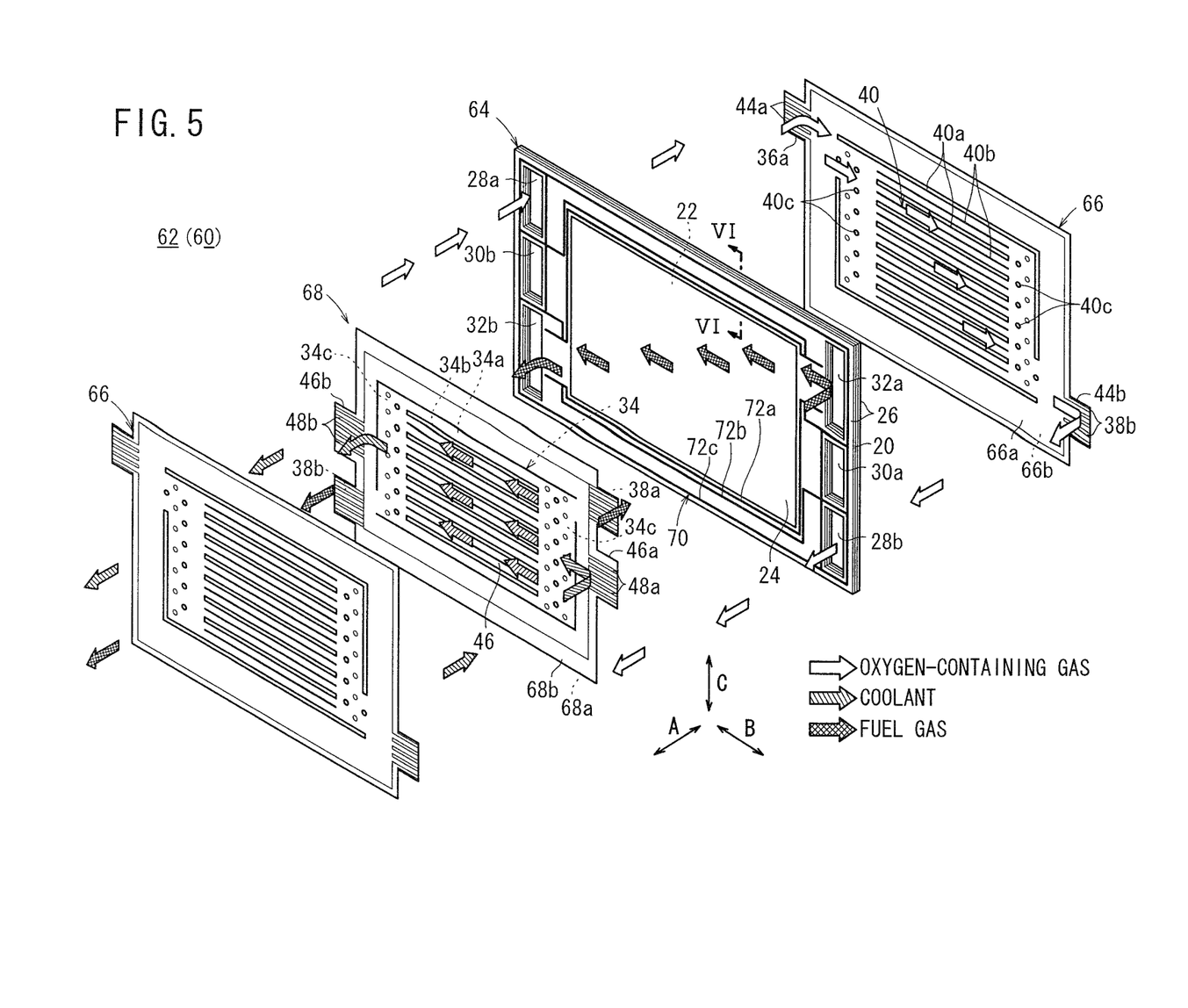
FIG. 5 is an exploded perspective view schematically showing a fuel cell according to a second embodiment of the present invention.
Figure 6:
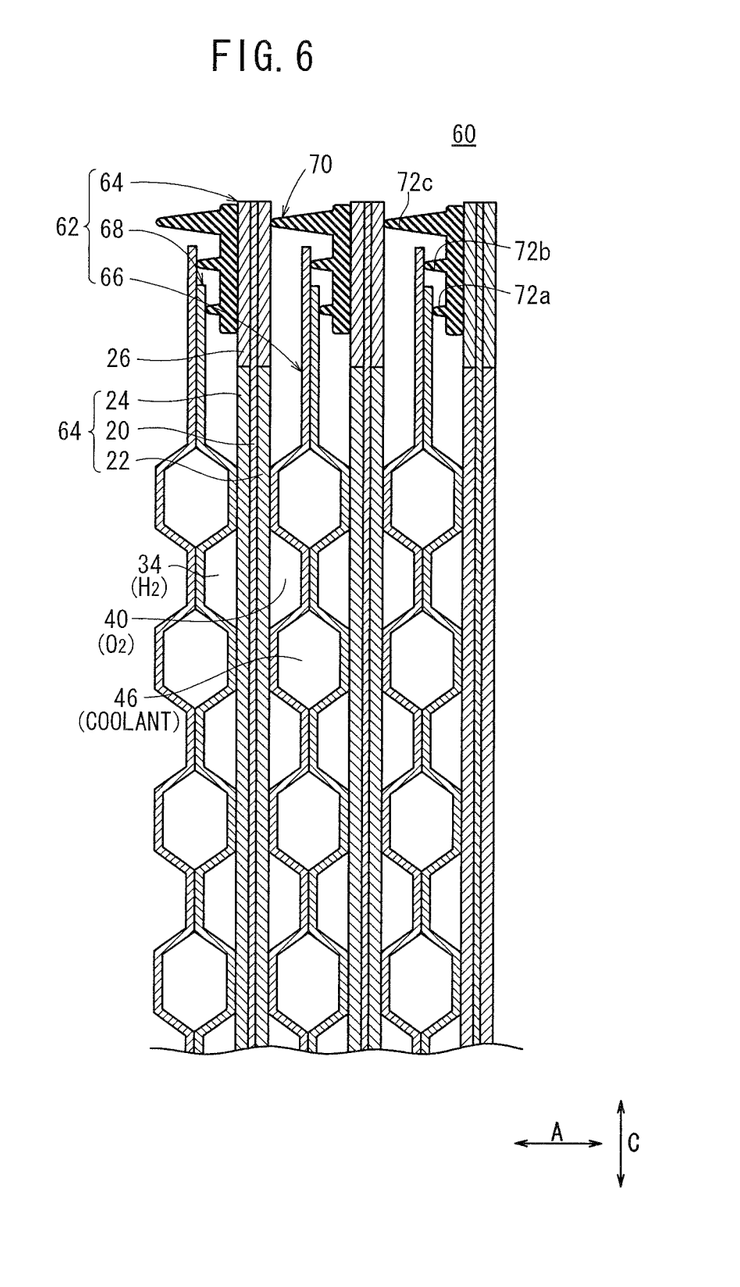
FIG. 6 is a cross sectional view showing the fuel cell, taken along a line VI-VI in FIG. 5.

FIG. 5 is an exploded perspective view showing a fuel cell 60 according to a second embodiment of the present invention. FIG. 6 is a cross sectional view showing the fuel cell 60, taken along a line VI-VI in FIG. 5.

The constituent elements that are identical to those of the fuel cell 10 according to the first embodiment are labeled with the same reference numeral, and description thereof will be omitted. Further, also in third and fourth embodiments as descried later, the constituent elements that are identical to those of the fuel cell 10 according to the first embodiment are labeled with the same reference numeral, and description thereof will be omitted.

The fuel cell 60 is formed by stacking a plurality of unit cells (cell units) 62, and each of the unit cells 62 includes a membrane electrode assembly 64, and a first metal separator 66 and a second metal separator 68 sandwiching the membrane electrode assembly 64.

The first metal separator 66 and the second metal separator 68 are provided inside the fluid passages. The outer dimensions of the first metal separator 66 are larger than the outer dimensions of the second metal separator 68.

The first metal separator 66 has an oxygen-containing gas flow field 40 on its surface 66a facing the membrane electrode assembly 64. The second metal separator 68 has a fuel gas flow field 34 on its surface 68a facing the membrane electrode assembly 64. A coolant flow field 46 is formed between a surface 66b of the first metal separator 66 and a surface 68b of the second metal separator 68.

As shown in FIG. 6, a seal member 70 is formed integrally on a surface of the frame 26 of the membrane electrode assembly 64 facing the second metal separator 68. The seal member 70 includes a first seal 72a, a second seal 72b, and a third seal 72c. The first seal 72a contacts the outer end of the second metal separator 68. The second seal 72b is provided outside the outer end of the second metal separator 68, and contacts the outer end of the first metal separator 66 of the adjacent unit cell 62. The third seal 72c contacts the frame 26 of the membrane electrode assembly 64 of the adjacent unit cell 62.

The first seal 72a functions as a fuel gas seal for preventing leakage of the fuel gas while connecting the fuel gas supply passage 32a and the fuel gas discharge passage 32b to the fuel gas flow field 34. The second seal 72b functions as a coolant seal for preventing leakage of the coolant while connecting the coolant supply passage 30a and the coolant discharge passage 30b to the coolant flow field 46. The third seal 72c functions as an oxygen-containing gas seal for preventing leakage of the oxygen-containing gas. The third seal 72c contacts the membrane electrode assembly 64.

In the second embodiment, the seal member 70 formed on one surface of the frame 26 includes the first seal 72a, the second seal 72b, and the third seal 72c. In the structure, the same advantages as in the case of the first embodiment are obtained. For example, the sizes of the first metal separator 66 and the second metal separator 68 are small, and the first metal separator 66 and the second metal separator 68 are produced at low cost. Further, the entire fuel cell 60 can be obtained economically.

Figure 7:
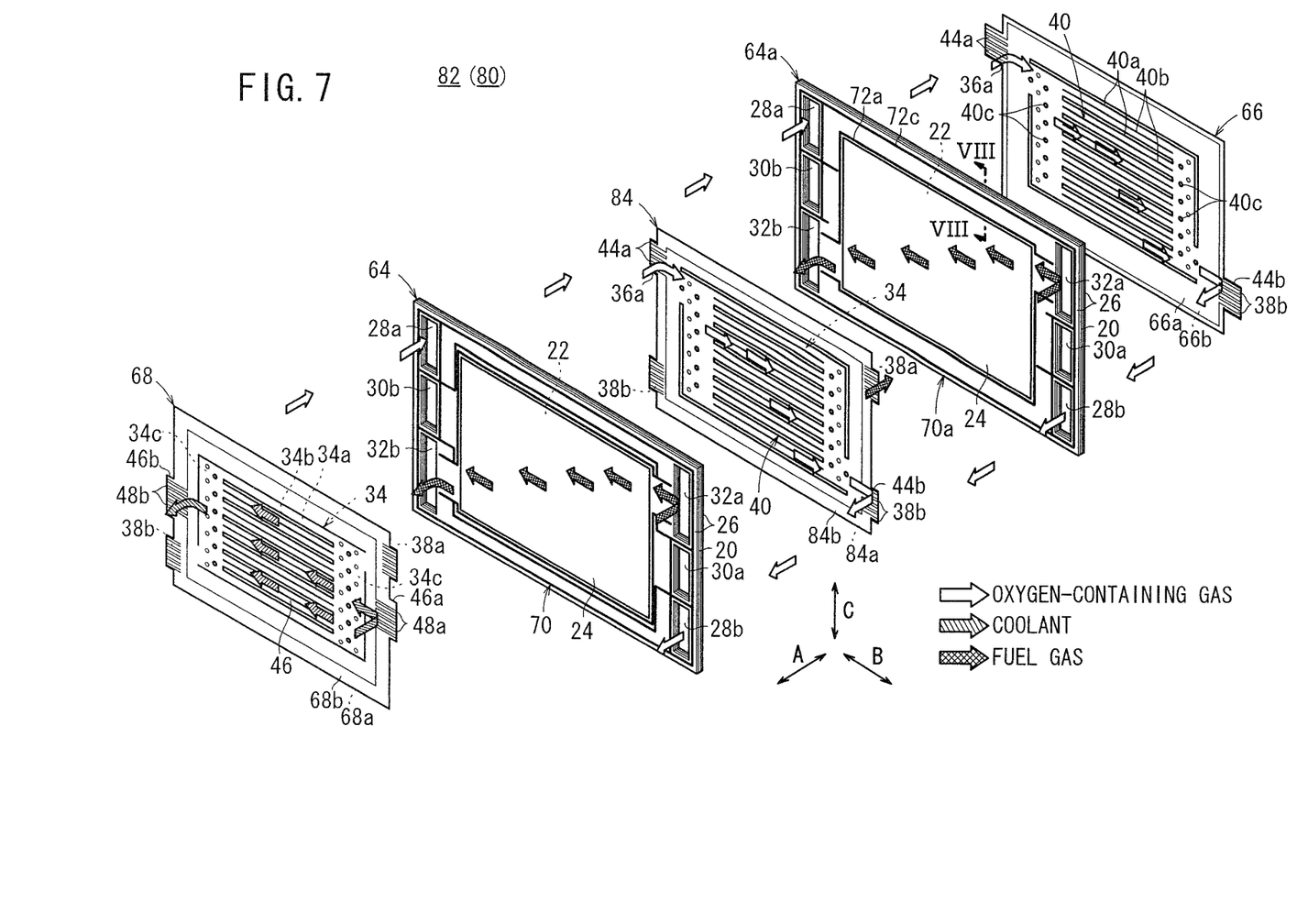
FIG. 7 is an exploded perspective view showing a fuel cell according to a third embodiment of the present invention.
Figure 8:
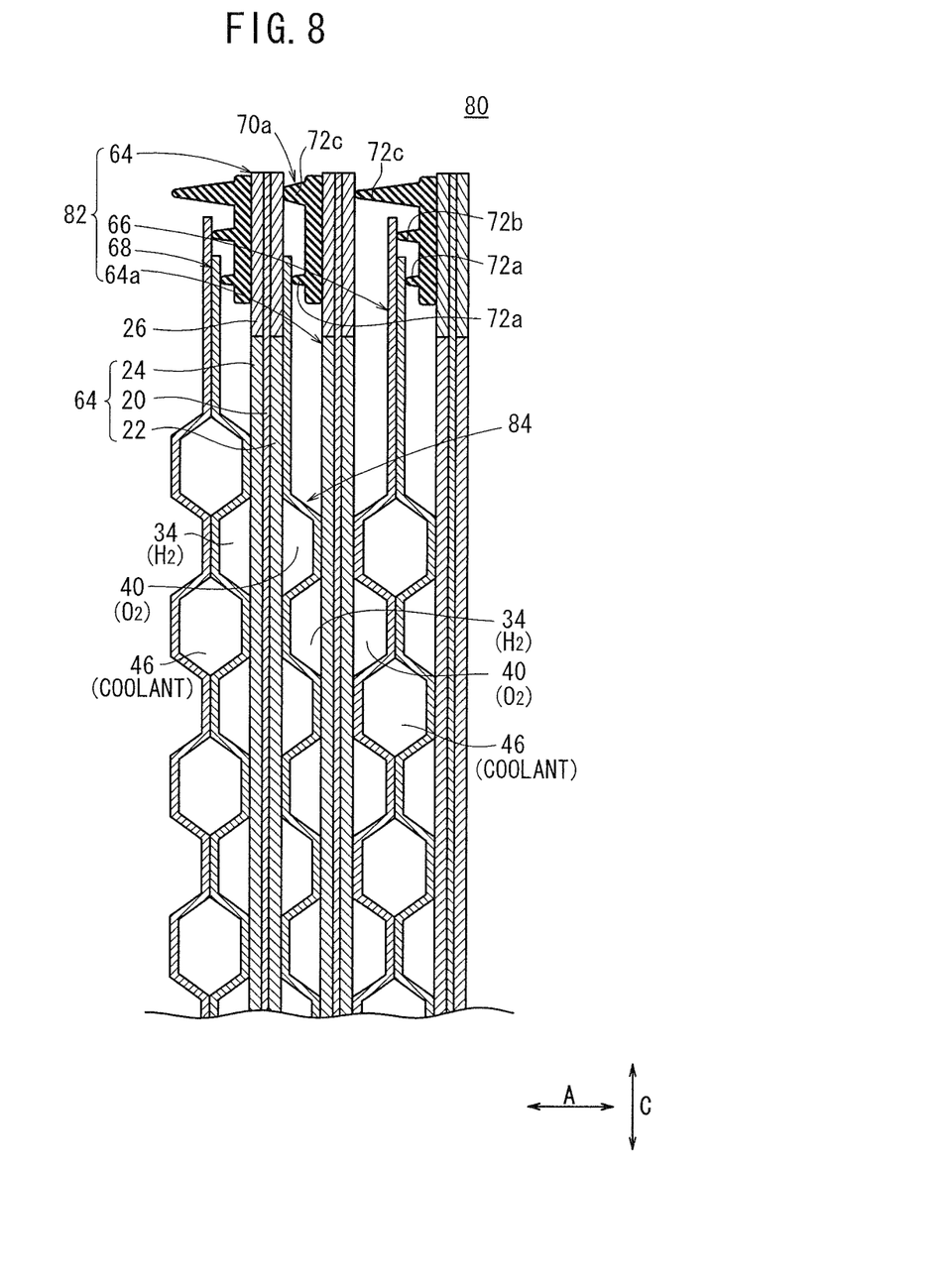
FIG. 8 is a cross sectional view showing the fuel cell, taken along a line VIII-VIII in FIG. 7.

FIG. 7 is an exploded perspective view showing a fuel cell 80 according to a third embodiment of the present invention. FIG. 8 is a cross sectional view showing the fuel cell 80, taken along a line VIII-VIII in FIG. 7.

The fuel cell 80 is obtained by modifying the fuel cell 60 according to the second embodiment to adopt so called skip cooling structure where the coolant flow field 46 is provided for every certain number of membrane electrode assemblies, e.g., every two membrane electrode assemblies 64.

The fuel cell 80 includes a plurality of cell units 82 stacked in a direction indicated by an arrow A. Each of the cell units 82 is formed by stacking a first metal separator 66, a membrane electrode assembly 64a, an intermediate metal separator 84, the membrane electrode assembly 64, and a second metal separator 68 in the direction indicated by the arrow A.

The intermediate metal separator 84 has a fuel gas flow field 34 on its surface 84a facing the membrane electrode assembly 64a. The fuel gas flow field 34 is connected to the fuel gas supply passage 32a and the fuel gas discharge passage 32b through the inlet channel 38a and the outlet channel 38b, respectively.

The intermediate metal separator 84 has an oxygen-containing gas flow field 40 on its surface 84b facing the membrane electrode assembly 64. The oxygen-containing gas flow field 40 is connected to the oxygen-containing gas supply passage 28a and the oxygen-containing gas discharge passage 28b through the inlet channel 44a and the outlet channel 44b, respectively.

In the membrane electrode assembly 64, the A seal member 70a is formed on a surface of the frame 26 facing the intermediate metal separator 84. As shown in FIG. 8, the seal member 70a includes a first seal 72a which slidably contacts the outer end of the intermediate metal separator 84, and a third seal 72c which slidably contacts the frame 26 of the membrane electrode assembly 64.

In the third embodiment, so called skip cooling structure is adopted. Therefore, the number of components in the fuel cell 80 is effectively reduced. Accordingly, further reduction in the weight of the fuel cell 80 is achieved, and the fuel cell 80 is produced economically.

Figure 9:
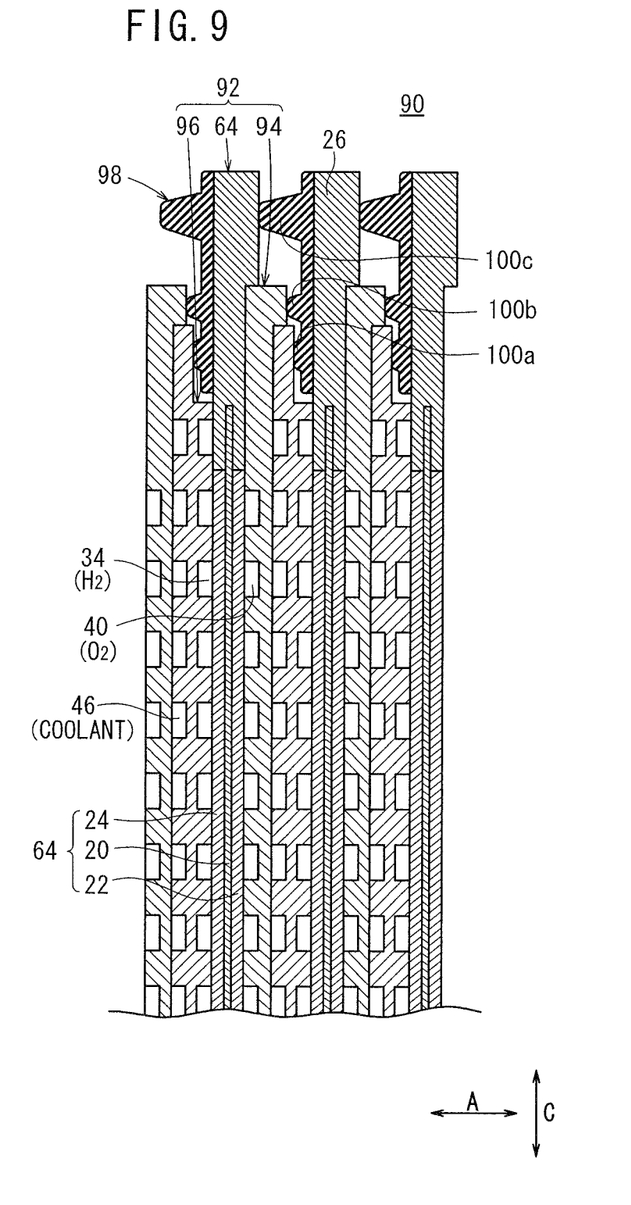
FIG. 9 is a cross sectional view schematically showing a fuel cell according to a fourth embodiment of the present invention.

FIG. 9 is a cross sectional view schematically showing a fuel cell 90 according to a fourth embodiment of the present invention.

The fuel cell 90 is formed by stacking a plurality of unit cells (cell units) 92 in the direction indicated by the arrow A. Each of the unit cells 92 includes a membrane electrode assembly 64 and a first carbon separator 94 and a second carbon separator 96 sandwiching the membrane electrode assembly 64.

The fuel cell 90 has substantially the same structure as the fuel cell 60 according to the second embodiment. The first carbon separator 94 has the same structure as the first metal separator 66, and the second carbon separator 96 has the same structure as the second metal separator 68. The outer dimensions of the first carbon separator 94 are larger than the outer dimensions of the second carbon separator 96.

A seal member 98 is formed on the frame 26 of the membrane electrode assembly 64. The seal member 98 includes a first seal 100a, a second seal 100b, and a third seal 100c. The first seal 100a slidably contacts the outer end of the second carbon separator 96. The second seal 100b slidably contacts the outer end of the first carbon separator 94 of the adjacent unit cell 92. The third seal 100c slidably contacts the frame 26 of the membrane electrode assembly 64 of the adjacent unit cell 92.

In the fourth embodiment, the first carbon separator 94 and the second carbon separator 96 are used instead of the first metal separator 66 and the second metal separator 68. No fluid passages are formed in the first carbon separator 94 and the second carbon separator 96.

In the structure, the same advantages as in the cases of the first to third embodiments are obtained. For example, reduction in the sizes and weights of the first carbon separator 94 and the second carbon separator 96 is achieved, and the overall weight of the fuel cell 90 is reduced effectively. The carbon separators may be used also in the first and third embodiments.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a cell unit formed by stacking an electrolyte electrode assembly between a first separator and a second separator in a stacking direction, said electrolyte electrode assembly including a pair of electrodes and an electrolyte interposed between said electrodes, a frame being provided in an outer end of said electrolyte electrode assembly;

wherein a first seal, a second seal, and a third seal around said electrodes are disposed on the frame, wherein the first seal surrounds one of the electrodes so as to seal one reactant gas, the second seal surrounds one of the first and second separators to seal a coolant, and the third seal surrounds the other of the electrodes so as to seal another reactant gas, wherein said first seal, said second seal, and said third seal are offset from each other in the stacking direction, wherein the frame is separate and distinct from the first, second and third seals, wherein each of the first seal, the second seal and the third seal does not extend beyond the frame in a direction perpendicular to the stacking direction.

2. A fuel cell according to claim 1, wherein fluid passages including a reactant gas supply passage, a reactant gas discharge passage, a coolant supply passage, and a coolant discharge passage extend through said frame in the stacking direction; and outer ends of said first separator and said second separator are provided inside said fluid passages.

3. A fuel cell according to claim 1, wherein outer dimensions of said first separator are smaller than outer dimensions of said second separator;

said first seal and said second seal are provided on a surface of said frame adjacent to said first separator, said first seal slidably contacts an outer end of said first separator, and said second seal slidably contacts an outer end of said second separator of one of adjacent cell units; and said third seal is provided on a surface of said frame adjacent to said second separator, said third seal is provided outside the outer end of said second separator, and slidably contacts said frame of the other of the adjacent cell units.

4. A fuel cell according to claim 1, wherein outer dimensions of said first separator are larger than outer dimensions of said second separator;

said first seal, said second seal, and said third seal are provided on a surface of said frame adjacent to said second separator, said first seal slidably contacts an outer end of said second separator;

said second seal is provided outside the outer end of said second separator, and said second seal slidably contacts an outer end of said first separator of an adjacent cell unit; and said third seal contacts said frame of said adjacent cell unit.

5. A fuel cell according to claim 1, wherein said first seal, said second seal, and said third seal are offset from each other in the direction perpendicular to the stacking direction such that the first seal is positioned innermost and the third seal is positioned outermost.

* * * * *